United States Patent [19]

Shibanai et al.

[11] Patent Number: 4,677,177

[45] Date of Patent: Jun. 30, 1987

[54] RUST PREVENTIVE AND METHOD FOR PRODUCING THE SAME

[75] Inventors: Ichiro Shibanai, Tokyo; Kenji Nakamura, Osaka, both of Japan

[73] Assignee: Japan Liquid Crystal Co., Ltd., Tokyo, Japan

[21] Appl. No.: 801,754

[22] Filed: Nov. 26, 1985

[30] Foreign Application Priority Data

Jun. 18, 1985 [JP] Japan ................... 60-132576

[51] Int. Cl.$^4$ ........................ C08L 1/02; C08L 1/08
[52] U.S. Cl. ............................ 527/300; 527/312; 536/103; 252/390; 523/124
[58] Field of Search ............ 524/27, 58; 562/507, 562/400; 523/124; 527/300, 312; 536/103; 252/390

[56] References Cited

U.S. PATENT DOCUMENTS 2,926,175  2/1960  Linn ................................ 527/300
4,356,115 10/1982  Shibanai et al. ............... 527/300
4,432,802  2/1984  Harata et al. ................... 524/27

FOREIGN PATENT DOCUMENTS 61-03631  2/1986  Japan .

*Primary Examiner*—John Kight
*Assistant Examiner*—Nathan M. Nutter
*Attorney, Agent, or Firm*—Burgess, Ryan & Wayne

[57] ABSTRACT

Maltooligosaccharide syrup is hydrogenated under nickel catalyst and high pressure so as to reduce the end-groups of the maltooligosaccharide syrup. The reduced syrup and cyclodextrin are mixed, and the volatile corrosion inhibitor is included by means of the cyclodextrin to form cyclodextrin clathrate compound of volatile corrosion inhibitor. The cyclodextrin clathrate compound of volatile corrosion inhibitor is mixed with a thermoplastic synthetic resin, such as polypropylene, polyethylene, ethylene-vinyl acetate copolymer, polyvinyl chloride. Then, the thermoplastic resin mixed with the volatile corrosion inhibitor is formed in a desired shape, by way of blown-film extrusion, injection molding or expansion molding.

The thus obtained rust preventive comprises a thermoplastic synthetic resin including a cyclodextrin clathrate compound of volatile corrosion inhibitor.

17 Claims, No Drawings

RUST PREVENTIVE AND METHOD FOR PRODUCING THE SAME

TECHNICAL FIELD OF THE INVENTION

The present invention relates to rust preventive, especially rust preventive utilizing volatile corrosion inhibitor, which is used for rust prevention of metallic products, such as automobiles, industrial machines, precision machines, tools, or their parts. The present invention also relates to a method for producing the rust preventive.

PRIOR ART

Conventionally, volatile corrosion inhibitor has been widely used in order to readily prevent a material from being corroded by atmosphere, wherein the volatile corrosion inhibitor is put within the package of the material so that the vapor of volatile corrosion inhibitor is physically absorbed onto or chemically reacted with the metallic surface. Especially, volatile corrosion inhibitor is conveniently used: with equipments or parts with which rust preventive oil cannot be used; with equipments, such as to be exported, which must be stored and transported for a long or uncertain time period; or with precision equipments or electrical equipments.

Volatile corrosion inhibitor is generally packaged in bags or formed in powder, tablet, alcoholic solution or an aqueous solution, or antitarnish paper wherein volatile corrosion inhibitor is coated onto or impregnated with a paper or a cloth.

However, since the volatile corrosion inhibitor is vaporized at ordinary temperatures, there causes a problem that the rust preventive effects of the volatile corrosion inhibitor are lost in a very short time period, if the volatile corrosion inhibitor is merely sprayed to or coated onto the materials.

Accordingly, in general, the metallic materials are packaged after the volatile corrosion inhibitor is sprayed to or coated onto the metallic materials so as to prevent vaporized volatile corrosion inhibitor from scattering, or the metallic materials are packaged with tablets of volatile corrosion inhibitor or antitarnish papers so as to prevent vaporized volatile corrosion inhibitor from escaping. The effective life of volatile corrosion inhibitor remarkably depends on the outer packaging materials, and the effective life, when the materials are packaged in films or aluminum foils, is tens of times the effective life, when the material are roughly packaged in papers.

In both cases, it is necessary to prepare packaging materials in addition to volatile corrosion inhibitor. Further, it is necessary to package in such a manner that escape of vaporized volatile corrosion inhibitor is prevented from occurring as much as possible because of the reasons described above, and accordingly, such a packaging operation is very difficult. In addition, if a volatile corrosion inhibitor of a powder type or solution type is used, it is necessary to spray or coat the volatile corrosion inhibitor onto the materials. Further, when a volatile corrosion inhibitor of a powder type is used, the powder may remain on the materials, and accordingly, the performance of the materials may be degraded if the materials are precision equipment, or the appearance of the objective materials may be aesthetically damaged.

Contrary to this, if a volatile corrosion inhibitor of the tablet type or bag type is used, it is unnecessary to spray or coat volatile corrosion inhibitor onto the materials. However, special packaging is required to fully achieve the rust preventive effect of the volatile corrosion inhibitor.

If materials having projections and recesses are packaged in antitarnish papers, the antitarnish papers may be easily broken. As a result, the rust preventive effect may not be fully achieved, and further, broken pieces of papers may remain adhering on the materials.

OBJECTS OF THE INVENTION

An object of the present invention is to obviate the problems inherent in the prior art, i.e., the rust preventive effects are lost in a very short time, other packaging materials are required to be prepared in addition to volatile corrosion inhibitor, troublesome spraying or coating of volatile corrosion inhibitor is necessary, or pieces of antitarnish paper remain adhering on the materials.

Another object of the present invention is to provide a rust preventive which rust preventive effect lasts for a long time period.

A still other object of the present invention is to provide a rust preventive which also can be used as a packaging material.

A further object of the present invention is to provide a method for producing the rust preventive of the present invention.

SUMMARY OF THE INVENTION

According to one aspect of the present invention, the above-described objects are achieved by a rust preventive which comprises a thermoplastic synthetic resin including a cyclodextrin clathrate compound of volatile corrosion inhibitor. In other words, the thermoplastic synthetic resin of the present invention contains volatile corrosion inhibitor which is entrapped in cyclodextrin.

It is preferred that the rust preventive is formed in a film, a molded shape which is suitable for storing a material, or a foam, so that the rust preventive functions as a packaging material as well as a rust preventive.

According to the rust preventive of the present invention, the volatile corrosion inhibitor is mixed with the thermoplastic synthetic resin and is gradually vaporized. Accordingly, a substantially constant rust preventive effect lasts for a long time period according to the present invention.

Furthermore, since the volatile corrosion inhibitor is changed to a cyclodextrin clathrate compound, it becomes chemically stable and is thermally durable at a high temperature of about 260° C. Accordingly, the volatile corrosion inhibitor is not decomposed during a molding operation, if the volatile corrosion inhibitor is mixed with a thermoplastic synthetic resin and is subjected to a molding operation. Further, the clathrate compound can be uniformly mixed with a thermoplastic synthetic resin since it has uniform dispersion and good compatibility with the thermoplastic synthetic resin. Accordingly, the quality of the rust preventive of the present invention which is made of the thermoplastic synthetic resin can be uniform.

If the rust preventive of the present invention is formed in a film, a molded shape which is suitable for storing a material, or a foam, the materials can be easily packaged by the rust preventive of the present invention.

Furthermore, according to another aspect of the present invention, a method for producing the rust preventive is provided. The method comprises:

including volatile corrosion inhibitor by means of cyclodextrin to form cyclodextrin clathrate compound of the volatile corrosion inhibitor;

mixing the cyclodextrin clathrate compound of volatile corrosion inhibitor with a thermoplastic synthetic resin; and forming or molding the thermoplastic resin mixed with the volatile corrosion inhibitor in a desired shape.

In order to avoid the scorching of cyclodextrin containing syrup, it is preferable that reducing end-groups of maltooligosaccharide syrup are almost completely reduced, and that then, reduced cyclodextrin syrup, which is a mixture of the reduced syrup and cyclodextrin, is used to include volatile corrosion inhibitor to form cyclodextrin clathrate compound of the volatile corrosion inhibitor.

DETAILED DESCRIPTION OF THE INVENTION

The rust preventive of the present invention comprises a thermoplastic synthetic resin which includes a cyclodextrin clathrate compound of volatile corrosion inhibitor.

The volatile corrosion inhibitor of the present invention may be any conventionally known volatile corrosion inhibitor, for example, dicyclohexyl ammonium nitrite, cyclohexylamine carbonate, diisopropylamine nitrite, hexamethylenetetramine, benzotriazole. The volatile corrosion inhibitor is selectively used for steel, for copper or for all metal in accordance with the material of construction of the materials.

The cyclodextrin of the present invention may be alpha-cyclodextrin, beta-cyclodextrin, gamma-cyclodextrin, a derivative of cyclodextrin, or the mixture thereof. A cyclodextrin may be a powder or a cyclodextrin-containing starch decomposition product (for example, Celdex CH-20, manufactured by Nippon Shokuhin Kako K.K.)

The cylodextrin clathrate compound of volatile corrosion inhibitor, wherein volatile corrosion inhibitor is entrapped in cyclodextrin, may be produced by way of a saturated aqueous solution method or a kneading method.

More specifically, in the saturated aqueous solution method, a constant amount of volatile corrosion inhibitor is added to a saturated aqueous solution of cyclodextrin or a supersaturated aqueous solution of cyclodextrin, and then, the solution is agitated for a time between tens of minutes and some hours under a temperature below 70° C., and cyclodextrin clathrate compound is obtained.

In the kneading method, water or hot water is added to cyclodextrin to form a slurry, and then, a required amount of volatile corrosion inhibitor is added to the slurry at a temperature below 70° C. Thereafter, the slurry is agitated well in a kneader for a time between tens of minutes and some hours, and pasty material containing cyclodextrin clathrate compound is obtained. If powder cyclodextrin is used in this kneading method, hot water, the weight of which is between 0.1 and 6 times of the weight of the cyclodextrin, is added to the cyclodextrin to form a paste or suspension.

When a cyclodextrin-containing starch decomposition product or a cyclodextrin containing malt syrup available on the market is used, about the same weight of water as that of decomposition product or syrup is added or no water is added, since the decomposition product or syrup contains some water between about 25 to 40% or 70 to 80%.

When a volatile corrosion inhibitor of a powder type is used, it is preferred that the volatile corrosion inhibitor has been previously dissolved in a solution which is suitable to dissolved volatile corrosion inhibitor, such as methanol, ethanol, or hot water, before the volatile corrosion inhibitor is subjected to an operation for forming a clathrate compound. For example, the weight ratio of the volatile corrosion inhibitor and the solution is set 1:1, and the volatile corrosion inhibitor and the solution are stirred and mixed at a temperature between 50° and 70° C. It is also preferred to add some amount of liquid paraffin.

The ratio of the volatile corrosion inhibitor, which is used as a guest, and the cyclodextrin, which is used as a host, is not limited as long as the volatile corrosion inhibitor can be included in the clathrate compound. For example, molar ratio of about 1:1 can be used.

The paste produced by the above-described saturated aqueous solution method for kneading method and containing cyclodextrin clathrate compound is rinsed, and then is dried by way of spraying, ventilating or freezing method and powder clathrate compound is obtained.

When a commercially available cyclodextrin containing malt syrup is used to produce cyclodextrin clathrate compound of volatile corrosion inhibitor, scorching, i.e., oxidation, of the syrup may occur if the treating temperature is high. As a result, there may occur a problem that volatile corrosion inhibitor cannot be fully included by cyclodextrin. In such a case, it is preferred that the end-groups of the maltooligosaccharide syrup are almost completely reduced, and that the reduced cyclodextrin syrup, which is a mixture of the reduced syrup and cyclodextrin, is used to include the volatile corrosion inhibitor to form cyclodextrin clathrate compound of volatile corrosion inhibitor.

If this preferred process is applied, the reducing end-groups of maltooligosaccharide syrup are almost completely reduced by hydrogenation to produce the reduced syrup, and accordingly, the syrup after the hydrogenation contains substantially no reducing end-groups. Therefore, the syrup will not be easily oxidized, and its stability against high temperature is increased. Further, the syrup will not be easily colored, since the reaction with amino groups, such as amino acid, i.e., amino carbonyl reaction, does not occur.

Thereafter, the clathrate compound of paste or powder type thus produced and containing cyclodextrin clathrate compound of volatile corrosion inhibitor is mixed with a thermoplastic synthetic resin, and then the mixed resin is formed in a desired shape. As a result, the rust preventive of the present invention is obtained.

Known thermoplastic synthetic resins may be used for the rust preventive of the present invention, and polyethylene, polypropylene, flexible polyvinyl chloride, or ethylene-vinyl acetate copolymer are especially suitable for the thermoplastic synthetic resin of the present invention.

When the thermoplastic synthetic resin and the clathrate compound are mixed, thermoplastic synthetic resin of powder or pellet type may be mixed with clathrate compound of powder type, or thermoplastic synthetic resin of powder or pellet type is mixed with paste containing clathrate compound. Alternatively, clathrate compound of powder type is previously added to a suitable solvent, such as dimethylformamide, and is agitated to produce a solution containing cyclodextrin clathrate compound. Then, thermoplastic synthetic resin of powder or pellet type may be added to this solution.

The mixing ratio of the thermoplastic synthetic resin and the cyclodextrin clathrate compound of volatile corrosion inhibitor is not limited. For example, the ratio of 1:1 in weight may be applicable when both are of powder type.

The mixture of the thermoplastic synthetic resin and the cyclodextrin clathrate compound of volatile corrosion inhibitor may be formed in tablets by way of a tablet machine, and the obtained tablets may be used as they are. In some cases, it is preferred that the mixture is formed in a suitable shape by way of extrusion, injection molding, expansion molding or the like, because the thus obtained materials may also be used as packaging materials.

For example, film may be formed by way of blown-film extrusion. It is preferred that the thus obtained film has a air permeability and has a thickness between about 30 and 50 micron.

Alternatively, the rust preventive of the present invention may be injection molded in a shape which has projections and recesses and which is suitable for storing an objective material for rust prevention. The thickness of the molded piece may be between about 1 and 2 mm.

Furthermore, the rust preventive of the present invention may be formed in a sheet-like foam or in a shaped article by way of expansion molding.

EXAMPLE 1

Twenty-five parts by weight of volatile corrosion inhibitor for steel, T.V.I. (trademark in Japan of dicyclohexyl ammonium nitrite manufactured by Chelest Chemical Co., Ltd.); 25 parts by weight of methanol; and a small amount of liquid paraffin were mixed and agitated at a temperature of between 50° and 60° C. Twenty-five parts by weight of cyclodextrin was dissolved in 50 parts by weight of hot water, and the former mixture of the volatile corrosion inhibitor and methanol was gradually poured into the latter solution at a temperature below 70° C., and was agitated for several hours. The clathrate compound thus obtained was rinsed and then was dried by spray drying or vacuum drying to produce clathrate compound of powder type.

The thus obtained 50 parts by weight of clathrate compound of powder type was mixed with 50 parts by weight of polyethylene pellet, and was formed in a film by way of blown-film extrusion.

EXAMPLE 2

Twenty parts by weight of volatile corrosion inhibitor for copper, C.V.I. (trademark in Japan of benztriazole manufactured by Chelest Chemical Co., Ltd.); 25 parts by weight of ethanol; and a small amount of liquid paraffin were mixed and agitated at a temperature between 50° and 60° C. Eighty parts by weight of Celdex CH-20 (manufactured by Nippon Shokuhin Kako K.K., malt syrup of cyclodextrin) and water (between 80 and 160 parts by weight) were mixed, and the former mixture of the volatile corrosion inhibitor and ethanol was gradually poured to the latter solution at a temperature below 70° C., and was agitated for several hours. The clathrate compound thus obtained was rinsed and then was dried by spray drying or vacuum drying to produce clathrate compound of powder type.

The thus obtained 10 parts by weight of clathrate compound of powder type was mixed with 90 parts by weight of polypropylene pellet, and was formed in a molded shape, having projections and recesses suitable for storing the material and having a thickness of from 1 to 2 mm, by way of injection molding. In this case, the molded shape was formed in a shape of a vessel part having cavity for completely storing the material and a closure part. Alternatively, the molded shape was formed in a conventionally known egg case which comprised a vessel part having cavity for partially storing the material and another vessel part for storing the remaining part of the material part, and the material was completely closed by the combination of the vessel parts.

EXAMPLE 3

Twenty parts by weight of volatile corrosion inhibitor for all metal, anticorr A (trademark of Chelest Chemical Co., Ltd.); 80 parts by weight of Celdex CH-20 (manufactured by Nippon Shokuhin Kako K.K., malt syrup of cyclodextrin) and water (between 80 and 160 parts by weight) were mixed at a temperature below 70° C., and was agitated for several hours. The clathrate compound thus obtained was rinsed and then was dried by spray drying or vacuum drying to produce clathrate compound of powder type.

The thus obtained 10 parts by weight of clathrate compound of powder type, 90 parts by weight of polystyrene, and blowing agent were mixed and were formed in a sheet by way of expansion molding.

The examples will now be explained wherein reduced cyclodextrin syrup is used to include volatile corrosion inhibitor by means of cyclodextrin to form clathrate compound.

The term "reduced cyclodextrin syrup" of the present invention means the reduced syrup containing cyclodextrin.

First, reducing end-groups of maltooligosaccharide syrup are almost completely reduced to produce reduced syrup. For example, maltooligosaccharide mixture, such as glucose, maltose or maltoriose, obtained by hydrolyzing starch with acid or enzyme, is hydrogenated under nickel catalyst and high pressure. In this case, it is preferred that the amount (or pressure) of hydrogen is set, for example, between 100 and 200 $Kg/cm^2$, and that the reaction is carried out at a temperature between about 70° and 160° C.

As a result, the reducing end-groups of maltooligosaccharide syrup are hydrogenated and are changed to the sugar-alcohol corresponding thereto, and their reducing capability is lost. Most specifically, glucose, maltose and maltoriose are changed to sorbitol, maltitol and maltotriitol, respectively, and their reducing capability is lost.

The sugar concentration of malt syrup is usually between 30 and 70%, however, Dextrose Equivalent, D.E., i.e., the ratio of reducible sugar to all the solid content becomes zero after hydrogeneration.

Since the reducing end-groups are lost after hydrogeneration, oxidation will not occur readily. Accordingly, the stability against high temperature is increased. Further, the syrup will not be easily colored, since the reaction with amino groups, such as amino acid, i.e., amino carbonyl reaction, does not occurs.

The mixture of the above-described reduced malt syrup and cyclodextrin can be used as the reduced cyclodextrin syrup which is used in the method of the present invention.

Preferably, malt syrup containing cyclodextrin, for example Celdex CH-20 or Celdex CH-30, manufactured by Nippon Shokuhin Kako K.K., is hydrogenated in a foregoing manner to produce the reduced cyclodextrin syrup.

In this case, since the cyclodextrin is not reducible and since the Dextrose Equivalent value thereof, (D.E., i.e., the ratio of reducible sugar to all the solid content) is zero, the cyclodextrin is not affected during the hydrogenation process and remains at it is. Contrary to this, the reducing end-groups of maltooligosaccharide syrup, containing glucose, maltose or the like except for cyclodextrin, are hydrogenated and are changed to a sugaralcohol corresponding thereto.

Furthermore, pure alpha-cyclodextrin, beta-cyclodextrin, gamma-cyclodextrin, the derivative of cyclodextrin, or the mixture thereof may be added to the reduced cyclodextrin syrup thus obtained. Alternatively, after pure malt syrup is reduced, cyclodextrin may be added to the reduced malt syrup to form the reduced cyclodextrin syrup.

Then, utilizing the thus obtained reduced cyclodextrin syrup, the volatile corrosion inhibitor similar to those described above is included in the cyclodextrin by way of a saturated aqueous solution method or a kneading method similar to those described above, and the cyclodextrin clathrate compound of volatile corrosion inhibitor is produced.

Thereafter, the cyclodextrin clathrate compound of volatile corrosion inhibitor obtained by including the volatile corrosion inhibitor in the reduced cyclodextrin syrup is mixed with the thermoplastic synthetic resin similar to that described above, and then, the thermoplastic synthetic resin containing volatile corrosion inhibitor is formed in a shape suitable for rust prevention.

Since the clathrate compound of volatile corrosion inhibitor, obtained by including the volatile corrosion inhibitor in the reduced cyclodextrin syrup, has a uniform dispersion and good compatibility with the synthetic resin, and therefore, it is uniformly mixed with the resin. Accordingly, the quality of the rust preventive of the present invention, which is made of the thermoplastic synthetic resin, can be uniform.

EXAMPLE 4

A syrup containing cyclodextrin (Celdex CH-30, manufactured by Nippon Shokuhin Kako K.K.) was reacted under nickel catalyst, high pressure (the amount of hydrogen was 150 Kg/cm$^2$) and 100° C. so that the reducing end-groups of maltooligosaccharide syrup were hydrogenated and a reduced cyclodextrin syrup was obtained.

Twenty-five parts by weight of volatile corrosion inhibitor for steel, T.V.I. (trademark in Japan of dicyclohexyl ammonium nitrite manufactured by Chelest Chemical Co., Ltd.); 25 parts by weight of methanol; and a small amount of liquid paraffin were agitated and mixed at a temperature between 50° and 60° C. The above-described mixture of the volatile corrosion inhibitor and methanol was gradually poured into the reduced cyclodextrin syrup at a temperature below 70° C., and was agitated for several hours.

The clathrate compound thus obtained was rinsed and then was dried by spray drying or vacuum drying to produce clathrate compound of powder type.

The thus obtained 50 parts by weight of clathrate compound of powder type was mixed with 50 parts by weight of polyethylene pellet, and was formed in a film by way of blown-film extrusion.

EXAMPLE 5

Celdex CH-20 (manufactured by Nippon Shokuhin Kako K.K., malt syrup of cyclodextrin) was hydrogenated to produce a reduced cyclodextrin syrup, and utilizing the thus obtained reduced cyclodextrin syrup and a volatile corrosion inhibitor for copper, the clathrate compound of a powder type was obtained in a manner similar to that described with regard to Example 2.

The clathrate compound of a powder type thus obtained was formed, in a manner similar to that described with regard to Example 2, in a molded shape, having projections and recesses suitable for storing the objective material and having a thickness of 1 to 2 mm.

EXAMPLE 6

Twenty parts by weight of volatile corrosion inhibitor for all metal, anticorr A (trademark in Japan of Chelest Chemical Co., Ltd.); 80 parts by weight of the reduced cyclodextrin syrup obtained by hydrogenating Celdex CH-30 (manufactured by Nippon Shokuhin Kako K.K., malt syrup of cyclodextrin) and water (between 80 and 160 parts by weight) were mixed at a temperature below 70° C., and was agitated for several hours. The clathrate compound thus obtained was rinsed and then was dried by spray drying or vacuum drying to produce clathrate compound of powder type.

The thus obtained 10 parts by weight of clathrate compound of powder type, 90 parts by weight of polystyrene, and blowing agent were mixed with each other and were formed in a sheet by way of expansion molding.

Since the volatile corrosion inhibitor has a tendency to be pyrolytically decomposed, conventionally such a mixture of volatile corrosion inhibitor and thermoplastic synthetic resin cannot be used for forming or molding. However, according to the present invention, the rust preventive comprising thermoplastic synthetic resin having effects of volatile corrosion inhibitor can be obtained. In the present invention, since the volatile corrosion inhibitor is changed to a clathrate compound of cyclodextrin, wherein volatile corrosion inhibitor is entrapped in cyclodextrin, the mixture of the cyclodextrin clathrate compound of volatile corrosion inhibitor and the thermoplastic synthetic resin can be used for forming or molding without causing pyrolysis of the volatile corrosion inhibitor. Further, this clathrate compound has a uniform dispersion and a good compatibility with the synthetic resin and can be uniformly mixed with the thermoplastic synthetic resin. Accordingly, the quality of the rust preventive of the present invention made of the thermoplastic synthetic resin can be uniform.

According to the rust preventive of the present invention, the volatile corrosion inhibitor mixed with the thermoplastic synthetic resin is gradually vaporized, and accordingly, a constant rust preventive effect can last for a very long time period.

Since the rust preventive of the present invention is made of a thermoplastic synthetic resin, it can be formed in any desired shape. Accordingly, it can be formed in a shape, such as film or molded shape, suitable for packaging the material.

A rust preventive of the film type according to the present invention has adherence to the material, and accordingly, the material can be sealingly packaged by the film of the present invention. Comparing with the conventional antitarnish paper, the rust preventive of the present invention is superior in its rust preventive capability. Furthermore, there is no problem that broken pieces are clogged with the material.

Since the molded shape or foamed shape of the present invention has projections and recesses corresponding to the outer shape of the material and serves as a packaging material. Accordingly, the material can easily packaged in the rust preventive of the present invention.

As described above, since the rust preventive of the present invention serves as a packaging material, and accordingly, specially designed packaging may be omitted. However, if packaging is applied in addition to the rust preventive of the present invention, the rust preventive effect is further enhanced and lasts for a longer time period.

When the end-groups of maltooligosaccharide syrup are almost completely reduced, and then, cyclodextrin syrup, which is a mixture of the reduced syrup and cyclodextrin, is used to include volatile corrosion inhibitor to form cyclodextrin clathrate compound of volatile corrosion inhibitor, the reduced cyclodextrin syrup has a more uniform dispersion capability of the cyclodextrin and the inclusion capability is increased. Accordingly, the clathrate compound of volatile corrosion inhibitor included by the reduced cyclodextrin syrup has a uniform dispersion and a good compatibility with the thermoplastic synthetic resin. Therefore, the quality of the rust preventive manufactured therefrom can be further enhanced.

When cyclodextrin containing malt syrup on the market is used to produce cyclodextrin clathrate compound of volatile corrosion inhibitor, the scorching, i.e., oxidation, of syrup may occur if the treating temperature is high. As a result, there may occur a problem that volatile corrosion inhibitor cannot be fully included by cyclodextrin. In such a case, it is preferred that end-groups of maltooligosaccharide syrup are substantially completely reduced, and that then, the reduced cyclodextrin syrup, which is a mixture of the reduced syrup and cyclodextrin, is used to include volatile corrosion inhibitor to form cyclodextrin clathrate compound of volatile corrosion inhibitor. Therefore, the syrup will not be easily oxidized, and its stability against high temperature is increased. Further, the syrup will not be easily colored, since the reaction with amino groups, such as amino acid, i.e., amino carbonyl reaction, does not occur.

What is claimed is:

1. A rust preventive which comprises a thermoplastic synthetic resin having incorporated therein a cyclodextrin clathrate compound of a volatile corrosion inhibitor.

2. The rust preventive according to claim 1, wherein said rust preventive is a film.

3. The rust preventive according to claim 1, wherein said rust preventive is a molded product in a shape which is suitable for storing a material for rust prevention.

4. The rust preventive according to claim 1, wherein said rust preventive is a foam.

5. The rust preventive according to claim 1, wherein said thermoplastic synthetic resin is polypropylene.

6. The rust preventive according to claim 1, wherein said thermoplastic synthetic resin is polyethylene.

7. The rust preventive according to claim 1, wherein said thermoplastic synthetic resin is ethylene-vinyl acetate copolymer.

8. The rust preventive according to claim 1, wherein said thermoplastic synthetic resin is polyvinyl chloride.

9. Method for producing rust preventive which comprises:
  contacting volatile corrosion inhibitor with a cyclodextrin to form a cyclodextrin clathrate compound of said volatile corrosion inhibitor;
  mixing said cyclodextrin clathrate compound of said volatile corrosion inhibitor with a thermoplastic synthetic resin; and
  forming or molding said thermoplastic resin mixed with said volatile corrosion inhibitor in a desired shape.

10. Method for producing a rust preventive which comprises:
  substantially reducing the reducing end-groups of maltooligosaccharide syrup;
  contacting a volatile corrosion inhibitor with reduced cyclodextrin syrup, which is a mixture of said reduced syrup and cyclodextrin, to form a cyclodextrin clathrate compound of said volatile corrosion inhibitor;
  mixing said cyclodextrin clathrate compound of said volatile corrosion inhibitor with a thermoplastic synthetic resin; and
  forming or molding said thermoplastic resin mixed with said volatile corrosion inhibitor in a desired shape.

11. Method for producing rust preventive according to claim 10, wherein said maltooligosaccharide syrup is hydrogenated under nickel catalyst and high pressure so as to reduce said end-groups of said maltooligosaccharide syrup.

12. A cyclodextrin clathrate compound of a volatile corrosion inhibitor.

13. The clathrate compound of claim 12, wherein said inhibitor is dicyclohexyl ammonium nitrite.

14. The clathrate compound of claim 12, wherein said inhibitor is cyclohexylamine carbonate.

15. The clathrate compound of claim 12, wherein said inhibitor is diisopropylamine nitrite.

16. The clathrate compound of claim 12, wherein said inhibitor is hexamethylenetetraamine.

17. The clathrate compound of claim 12, wherein said inhibitor is benztriazole.

* * * * *